(12) United States Patent
Craig et al.

(10) Patent No.: US 8,860,663 B2
(45) Date of Patent: Oct. 14, 2014

(54) POSE TRACKING PIPELINE

(71) Applicant: Microsoft Corpration, Redmond, WA (US)

(72) Inventors: Robert Matthew Craig, Bellevue, WA (US); Tommer Leyvand, Seattle, WA (US); Craig Peeper, Kirkland, WA (US); Momin M. Al-Ghosien, Sammamish, WA (US); Matt Bronder, Bellevue, WA (US); Oliver Williams, San Francisco, CA (US); Ryan M. Geiss, San Jose, CA (US); Jamie Daniel Joseph Shotton, Cambridge (GB); Johnny Lee, Redmond, WA (US); Mark Finocchio, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 14/088,184

(22) Filed: Nov. 22, 2013

(65) Prior Publication Data
US 2014/0078141 A1 Mar. 20, 2014

Related U.S. Application Data

(63) Continuation of application No. 13/871,974, filed on Apr. 26, 2013, now Pat. No. 8,610,665, which is a
(Continued)

(51) Int. Cl.
*G06F 3/033* (2013.01)
*G06K 9/00* (2006.01)
*G06T 19/00* (2011.01)
*H04N 11/02* (2006.01)

(52) U.S. Cl.
CPC .............. *G06T 19/00* (2013.01); *G06F 3/033* (2013.01); *G06K 9/00369* (2013.01); *A63F 2300/1093* (2013.01); *A63F 2300/1006* (2013.01)
USPC ........................ 345/158; 345/419; 375/240.12

(58) Field of Classification Search
CPC ........... G06K 9/00; G06F 3/033; H04N 11/02
USPC ......... 382/100, 103, 106–107, 123, 155, 162, 382/168, 180–181, 189–199, 219, 232, 254, 382/274, 276, 291, 312, 305, 154; 345/158, 345/419; 375/240.08, 240.12; 700/47
See application file for complete search history.

(56) References Cited

U.S. PATENT DOCUMENTS 4,627,620 A 12/1986 Yang
4,630,910 A 12/1986 Ross et al.
(Continued)

FOREIGN PATENT DOCUMENTS

CN 201254344 B 6/2010
EP 0583061 A2 2/1994
(Continued)

OTHER PUBLICATIONS

Kanade et al., "A Stereo Machine for Video-rate Dense Depth Mapping and its New Applications", IEEE Computer Society Conference on Computer Vision and Pattern Recognition, 1996, pp. 196-202,The Robotics Institute, Carnegie Mellon University, Pittsburgh, PA.

(Continued)

*Primary Examiner* — Seyed Azarian
(74) *Attorney, Agent, or Firm* — Gregg Wisdom; Micky Minhas

(57) ABSTRACT

A method of tracking a subject includes receiving from a source a depth image of a scene including the subject. The depth image includes a depth for each of a plurality of pixels. The method further includes identifying pixels of the depth image that image the subject and deriving from the identified pixels of the depth image one or more machine readable data structures representing the subject as a model including a plurality of shapes.

20 Claims, 7 Drawing Sheets

Related U.S. Application Data continuation of application No. 13/408,775, filed on Feb. 29, 2012, now Pat. No. 8,553,939, which is a continuation of application No. 12/603,437, filed on Oct. 21, 2009, now Pat. No. 8,295,546, which is a continuation-in-part of application No. 12/367,435, filed on Feb. 6, 2009, now abandoned.

(60) Provisional application No. 61/148,892, filed on Jan. 30, 2009.

(56) References Cited

U.S. PATENT DOCUMENTS

| | | | |
|---|---|---|---|
| 4,645,458 | A | 2/1987 | Williams |
| 4,695,953 | A | 9/1987 | Blair et al. |
| 4,702,475 | A | 10/1987 | Elstein et al. |
| 4,711,543 | A | 12/1987 | Blair et al. |
| 4,731,860 | A | 3/1988 | Wahl |
| 4,751,642 | A | 6/1988 | Silva et al. |
| 4,751,643 | A | 6/1988 | Lorensen et al. |
| 4,796,997 | A | 1/1989 | Svetkoff et al. |
| 4,809,065 | A | 2/1989 | Harris et al. |
| 4,817,950 | A | 4/1989 | Goo |
| 4,843,568 | A | 6/1989 | Krueger et al. |
| 4,893,183 | A | 1/1990 | Nayar |
| 4,901,362 | A | 2/1990 | Terzian |
| 4,925,189 | A | 5/1990 | Braeunig |
| 5,101,444 | A | 3/1992 | Wilson et al. |
| 5,148,154 | A | 9/1992 | MacKay et al. |
| 5,184,295 | A | 2/1993 | Mann |
| 5,229,754 | A | 7/1993 | Aoki et al. |
| 5,229,756 | A | 7/1993 | Kosugi et al. |
| 5,239,463 | A | 8/1993 | Blair et al. |
| 5,239,464 | A | 8/1993 | Blair et al. |
| 5,288,078 | A | 2/1994 | Capper et al. |
| 5,295,491 | A | 3/1994 | Gevins |
| 5,320,538 | A | 6/1994 | Baum |
| 5,347,306 | A | 9/1994 | Nitta |
| 5,385,519 | A | 1/1995 | Hsu et al. |
| 5,405,152 | A | 4/1995 | Katanics et al. |
| 5,417,210 | A | 5/1995 | Funda et al. |
| 5,423,554 | A | 6/1995 | Davis |
| 5,454,043 | A | 9/1995 | Freeman |
| 5,469,740 | A | 11/1995 | French et al. |
| 5,495,576 | A | 2/1996 | Ritchey |
| 5,516,105 | A | 5/1996 | Eisenbrey et al. |
| 5,524,637 | A | 6/1996 | Erickson |
| 5,534,917 | A | 7/1996 | MacDougall |
| 5,563,988 | A | 10/1996 | Maes et al. |
| 5,577,981 | A | 11/1996 | Jarvik |
| 5,580,249 | A | 12/1996 | Jacobsen et al. |
| 5,594,469 | A | 1/1997 | Freeman et al. |
| 5,597,309 | A | 1/1997 | Riess |
| 5,616,078 | A | 4/1997 | Oh |
| 5,617,312 | A | 4/1997 | Iura et al. |
| 5,638,300 | A | 6/1997 | Johnson |
| 5,641,288 | A | 6/1997 | Zaenglein, Jr. |
| 5,682,196 | A | 10/1997 | Freeman |
| 5,682,229 | A | 10/1997 | Wangler |
| 5,690,582 | A | 11/1997 | Ulrich et al. |
| 5,703,367 | A | 12/1997 | Hashimoto et al. |
| 5,704,837 | A | 1/1998 | Iwasaki et al. |
| 5,715,834 | A | 2/1998 | Bergamasco et al. |
| 5,875,108 | A | 2/1999 | Hoffberg et al. |
| 5,877,803 | A | 3/1999 | Wee et al. |
| 5,913,727 | A | 6/1999 | Ahdoot |
| 5,933,125 | A | 8/1999 | Fernie et al. |
| 5,971,583 | A | 10/1999 | Ohnishi et al. |
| 5,980,256 | A | 11/1999 | Carmein |
| 5,989,157 | A | 11/1999 | Walton |
| 5,995,649 | A | 11/1999 | Marugame |
| 6,005,548 | A | 12/1999 | Latypov et al. |
| 6,009,210 | A | 12/1999 | Kang |
| 6,016,487 | A | 1/2000 | Rioux et al. |
| 6,054,991 | A | 4/2000 | Crane et al. |
| 6,066,075 | A | 5/2000 | Poulton |
| 6,072,494 | A | 6/2000 | Nguyen |
| 6,073,489 | A | 6/2000 | French et al. |
| 6,077,201 | A | 6/2000 | Cheng |
| 6,098,458 | A | 8/2000 | French et al. |
| 6,100,896 | A | 8/2000 | Strohecker et al. |
| 6,101,289 | A | 8/2000 | Kellner |
| 6,128,003 | A | 10/2000 | Smith et al. |
| 6,130,677 | A | 10/2000 | Kunz |
| 6,141,463 | A | 10/2000 | Covell et al. |
| 6,147,678 | A | 11/2000 | Kumar et al. |
| 6,151,009 | A | 11/2000 | Kanade et al. |
| 6,152,856 | A | 11/2000 | Studor et al. |
| 6,159,100 | A | 12/2000 | Smith |
| 6,173,066 | B1 | 1/2001 | Peurach et al. |
| 6,173,070 | B1 | 1/2001 | Michael et al. |
| 6,181,343 | B1 | 1/2001 | Lyons |
| 6,188,777 | B1 | 2/2001 | Darrell et al. |
| 6,205,231 | B1 * | 3/2001 | Isadore-Barreca et al. ... 382/103 |
| 6,215,890 | B1 | 4/2001 | Matsuo et al. |
| 6,215,898 | B1 | 4/2001 | Woodfill et al. |
| 6,226,396 | B1 | 5/2001 | Marugame |
| 6,229,913 | B1 | 5/2001 | Nayar et al. |
| 6,256,033 | B1 | 7/2001 | Nguyen |
| 6,256,400 | B1 | 7/2001 | Takata et al. |
| 6,283,860 | B1 | 9/2001 | Lyons et al. |
| 6,289,112 | B1 | 9/2001 | Jain et al. |
| 6,299,308 | B1 | 10/2001 | Voronka et al. |
| 6,308,565 | B1 | 10/2001 | French et al. |
| 6,316,934 | B1 | 11/2001 | Amorai-Moriya et al. |
| 6,353,679 | B1 | 3/2002 | Cham et al. |
| 6,363,160 | B1 | 3/2002 | Bradski et al. |
| 6,384,819 | B1 | 5/2002 | Hunter |
| 6,411,744 | B1 | 6/2002 | Edwards |
| 6,430,997 | B1 | 8/2002 | French et al. |
| 6,476,834 | B1 | 11/2002 | Doval et al. |
| 6,496,598 | B1 | 12/2002 | Harman |
| 6,503,195 | B1 | 1/2003 | Keller et al. |
| 6,539,107 | B1 | 3/2003 | Michael et al. |
| 6,539,931 | B2 | 4/2003 | Trajkovic et al. |
| 6,570,555 | B1 | 5/2003 | Prevost et al. |
| 6,633,294 | B1 | 10/2003 | Rosenthal et al. |
| 6,640,202 | B1 | 10/2003 | Dietz et al. |
| 6,661,918 | B1 | 12/2003 | Gordon et al. |
| 6,674,877 | B1 * | 1/2004 | Jojic et al. ...................... 382/103 |
| 6,681,031 | B2 | 1/2004 | Cohen et al. |
| 6,714,665 | B1 | 3/2004 | Hanna et al. |
| 6,731,799 | B1 | 5/2004 | Sun et al. |
| 6,738,066 | B1 | 5/2004 | Nguyen |
| 6,757,571 | B1 * | 6/2004 | Toyama .......................... 700/47 |
| 6,765,726 | B2 | 7/2004 | French et al. |
| 6,771,818 | B1 | 8/2004 | Krumm et al. |
| 6,788,809 | B1 | 9/2004 | Grzeszczuk et al. |
| 6,801,637 | B2 | 10/2004 | Voronka et al. |
| 6,873,723 | B1 | 3/2005 | Aucsmith et al. |
| 6,876,496 | B2 | 4/2005 | French et al. |
| 6,937,742 | B2 | 8/2005 | Roberts et al. |
| 6,940,538 | B2 | 9/2005 | Rafey et al. |
| 6,950,534 | B2 | 9/2005 | Cohen et al. |
| 6,999,084 | B2 | 2/2006 | Mochizuki et al. |
| 7,003,134 | B1 | 2/2006 | Covell et al. |
| 7,036,094 | B1 | 4/2006 | Cohen et al. |
| 7,038,855 | B2 | 5/2006 | French et al. |
| 7,039,676 | B1 | 5/2006 | Day et al. |
| 7,042,440 | B2 | 5/2006 | Pryor et al. |
| 7,050,606 | B2 | 5/2006 | Paul et al. |
| 7,058,204 | B2 | 6/2006 | Hildreth et al. |
| 7,060,957 | B2 | 6/2006 | Lange et al. |
| 7,068,842 | B2 * | 6/2006 | Liang et al. ................... 382/181 |
| 7,113,918 | B1 | 9/2006 | Ahmad et al. |
| 7,121,946 | B2 | 10/2006 | Paul et al. |
| 7,170,492 | B2 | 1/2007 | Bell |
| 7,184,048 | B2 | 2/2007 | Hunter |
| 7,202,898 | B1 | 4/2007 | Braun et al. |
| 7,222,078 | B2 | 5/2007 | Abelow |
| 7,227,526 | B2 | 6/2007 | Hildreth et al. |
| 7,227,893 | B1 * | 6/2007 | Srinivasa et al. ......... 375/240.08 |
| 7,259,747 | B2 | 8/2007 | Bell |
| 7,308,112 | B2 | 12/2007 | Fujimura et al. |

(56) References Cited

U.S. PATENT DOCUMENTS

| | | | |
|---|---|---|---|
| 7,317,836 B2 | 1/2008 | Fujimura et al. | |
| 7,324,671 B2 | 1/2008 | Li et al. | |
| 7,348,963 B2 | 3/2008 | Bell | |
| 7,359,121 B2 | 4/2008 | French et al. | |
| 7,367,887 B2 | 5/2008 | Watabe et al. | |
| 7,372,977 B2 | 5/2008 | Fujimura et al. | |
| 7,379,563 B2 | 5/2008 | Shamaie | |
| 7,379,566 B2 | 5/2008 | Hildreth | |
| 7,389,591 B2 | 6/2008 | Jaiswal et al. | |
| 7,412,077 B2 | 8/2008 | Li et al. | |
| 7,421,093 B2 | 9/2008 | Hildreth et al. | |
| 7,430,312 B2 | 9/2008 | Gu | |
| 7,436,496 B2 | 10/2008 | Kawahito | |
| 7,450,736 B2 | 11/2008 | Yang et al. | |
| 7,452,275 B2 | 11/2008 | Kuraishi | |
| 7,460,690 B2 | 12/2008 | Cohen et al. | |
| 7,489,812 B2 | 2/2009 | Fox et al. | |
| 7,526,101 B2* | 4/2009 | Avidan | 382/103 |
| 7,536,032 B2 | 5/2009 | Bell | |
| 7,555,142 B2 | 6/2009 | Hildreth et al. | |
| 7,560,701 B2 | 7/2009 | Oggier et al. | |
| 7,570,805 B2 | 8/2009 | Gu | |
| 7,574,020 B2 | 8/2009 | Shamaie | |
| 7,576,727 B2 | 8/2009 | Bell | |
| 7,590,262 B2* | 9/2009 | Fujimura et al. | 382/104 |
| 7,593,552 B2 | 9/2009 | Higaki et al. | |
| 7,598,942 B2 | 10/2009 | Underkoffler et al. | |
| 7,607,509 B2 | 10/2009 | Schmiz et al. | |
| 7,620,202 B2 | 11/2009 | Fujimura et al. | |
| 7,668,340 B2 | 2/2010 | Cohen et al. | |
| 7,680,298 B2 | 3/2010 | Roberts et al. | |
| 7,683,954 B2 | 3/2010 | Ichikawa et al. | |
| 7,684,592 B2 | 3/2010 | Paul et al. | |
| 7,701,439 B2 | 4/2010 | Hillis et al. | |
| 7,702,130 B2 | 4/2010 | Im et al. | |
| 7,704,135 B2 | 4/2010 | Harrison, Jr. | |
| 7,710,391 B2 | 5/2010 | Bell et al. | |
| 7,729,530 B2 | 6/2010 | Antonov et al. | |
| 7,746,345 B2 | 6/2010 | Hunter | |
| 7,760,182 B2 | 7/2010 | Ahmad et al. | |
| 7,809,167 B2 | 10/2010 | Bell | |
| 7,834,846 B1 | 11/2010 | Bell | |
| 7,852,262 B2 | 12/2010 | Namineni et al. | |
| RE42,256 E | 3/2011 | Edwards | |
| 7,898,522 B2 | 3/2011 | Hildreth et al. | |
| 7,974,443 B2 | 7/2011 | Kipman et al. | |
| 8,009,871 B2 | 8/2011 | Rafii et al. | |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |
| 8,175,374 B2 | 5/2012 | Pinault et al. | |
| 8,249,334 B2 | 8/2012 | Berliner et al. | |
| 2003/0043270 A1 | 3/2003 | Rafey et al. | |
| 2004/0239670 A1 | 12/2004 | Marks | |
| 2006/0239558 A1 | 10/2006 | Rafii et al. | |
| 2006/0252541 A1 | 11/2006 | Zalewski et al. | |
| 2006/0274947 A1 | 12/2006 | Fujimura et al. | |
| 2007/0066393 A1 | 3/2007 | Paul et al. | |
| 2008/0026838 A1 | 1/2008 | Dunstan et al. | |
| 2008/0037829 A1 | 2/2008 | Givon | |
| 2008/0152191 A1 | 6/2008 | Fujimura et al. | |
| 2008/0181499 A1 | 7/2008 | Yang et al. | |
| 2009/0141933 A1 | 6/2009 | Wagg | |
| 2010/0103169 A1 | 4/2010 | Zhang et al. | |
| 2010/0183192 A1 | 7/2010 | Fritsch et al. | |
| 2010/0210359 A1 | 8/2010 | Krzeslo et al. | |
| 2010/0238160 A1 | 9/2010 | Yea et al. | |

FOREIGN PATENT DOCUMENTS

| | | |
|---|---|---|
| JP | 08044490 A1 | 2/1996 |
| JP | 2005287830 A | 10/2005 |
| WO | 93/10708 A1 | 6/1993 |
| WO | 97/17598 A1 | 5/1997 |
| WO | 99/44698 A1 | 9/1999 |
| WO | 0207839 A2 | 1/2002 |

OTHER PUBLICATIONS

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Non-rigid and Articulated Motion Workshop, 1997, University of Texas at Austin, Austin, TX.

Shag et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", in Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

(56) References Cited

OTHER PUBLICATIONS

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

"Articulated object tracking and pose estimation: a literature survey," <http://www.robots.ox.ac.uk/~teo/thesis/Thesis/deCampos3DHandTracking2.pdf>, Access date Oct. 20, 2010, 34 pages.

Badler, Norman I. et al., "Face Modeling and Editing with Statistical Local Feature Control Models," Published in International Journal of imaging Systems and Technology, col. 17, Issue 6, Apr. 2008, pp. 341-358, 32 pages.

Lee, Mun Wai et al., "Body Part Detection for Human Pose Estimation and Tracking," University of Southern California, Institute for Robotics and Intelligent Systems, Accessed Nov. 21, 2008, 8 pages.

Rogez, Gregory et al., "A Spatio-Temporal 2D-Models Framework for Human Pose Recovery in Monocular Sequences," Pattern Recognition 41, Sep. 2008, pp. 2926-2944, 19 pages.

Zhou, Huiyu et al., "A Survey-Human Movement Tracking and Stroke Rehabilitation," University of Essex Technical Report: CSM-420, ISSN 1744-8050, Dec. 8, 2004.

Park et al., "Segmentation and Tracking of Interacting Human Body Parts under Occulsion and Shadowing", Proceedings of the Workshop on Motion and Video Computing, IEEE, Dec. 2002, 7 pages.

Moeslund et al., "A Survey of Advances in Vision-Based Human Motion Capture and Analysis", Computer Vision and Image Understanding vol. 104, No. 2, pp. 90-126, Nov. 2006, 37 pages.

Kehl et al., "Full Body Tracking from Multiple Views Using Stochastic Sampling", IEEE Computer Society Conference on Computer Vision and Pattern Recognition, vol. 2, pp. 129-136, Jun. 2005, 8 pages.

Korean Intellectual Property Office, International Search Report and Written Opinion of PCT/US2010/020793, WIPO, Aug. 16, 2010, 12 pages.

iisu Datasheet, SoftKinetic, http://www.softkinetic.com/Portals/0/Download/iisu%E2%84%A2%20Datasheet%20V0.91.pdf, Available as early as Feb. 19, 2008, Accessed Jun. 3, 2014, 3 pages.

iisu by SoftKinetic Tutorial, SoftKinetic International SA, http://mylisu.com/doc/201203__iisu_Tutorial%20Unity.pdf, Mar. 30, 2012, 13 pages.

Softkinetic—3D, Marcelo Mafra, https://www.youtube.com/watch?v=q81KdhFW-q4, May 30, 2008, 2 pages.

* cited by examiner

POSE TRACKING PIPELINE

CROSS REFERENCE TO RELATED APPLICATIONS

This application is a continuation of U.S. patent application Ser. No. 13/871,974 filed Apr. 26, 2013, which is a continuation of U.S. patent application Ser. No. 13/408,775 filed Feb. 29, 2012, now U.S. Pat. No. 8,553,939, which is a continuation of U.S. patent application Ser. No. 12/603,437, filed Oct. 21, 2009, now U.S. Pat. No. 8,295,546, which is a continuation-in-part of U.S. patent application Ser. No. 12/367,435, filed Feb. 6, 2009, which claims priority to U.S. Provisional Patent Application No. 61/148,892, filed Jan. 30, 2009. The above applications are hereby incorporated herein by reference in their entirety.

BACKGROUND

Many computer games and other computer vision applications utilize complicated controls to allow users to manipulate game characters or other aspects of an application. Such controls can be difficult to learn, thus creating a barrier to entry for many games or other applications. Furthermore, such controls may be very different from the actual game actions or other application actions for which they are used. For example, a game control that causes a game character to swing a baseball bat may not at all resemble the actual motion of swinging a baseball bat.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method of tracking a human subject is disclosed. The method includes receiving from a source a depth image of a scene including the subject. The depth image includes a depth for each of a plurality of pixels. The method further includes identifying pixels of the depth image that image the subject and deriving from the identified pixels of the depth image one or more machine readable data structures representing the subject as a model including a plurality of shapes.

DETAILED DESCRIPTION

The present disclosure is directed to target recognition, analysis, and tracking. In particular, the use of a depth camera or other source for acquiring depth information for one or more targets is disclosed. Such depth information may then be used to efficiently and accurately model and track the one or more targets, as described in detail below. The target recognition, analysis, and tracking described herein provides a robust platform in which one or more targets can be consistently tracked at a relatively fast frame rate, even when the target(s) move into poses that have been considered difficult to analyze using other approaches (e.g., when two or more targets partially overlap and/or occlude one another; when a portion of a target self-occludes another portion of the same target, when a target changes its topographical appearance (e.g., a human touching his or her head), etc.).

Figure 1A:
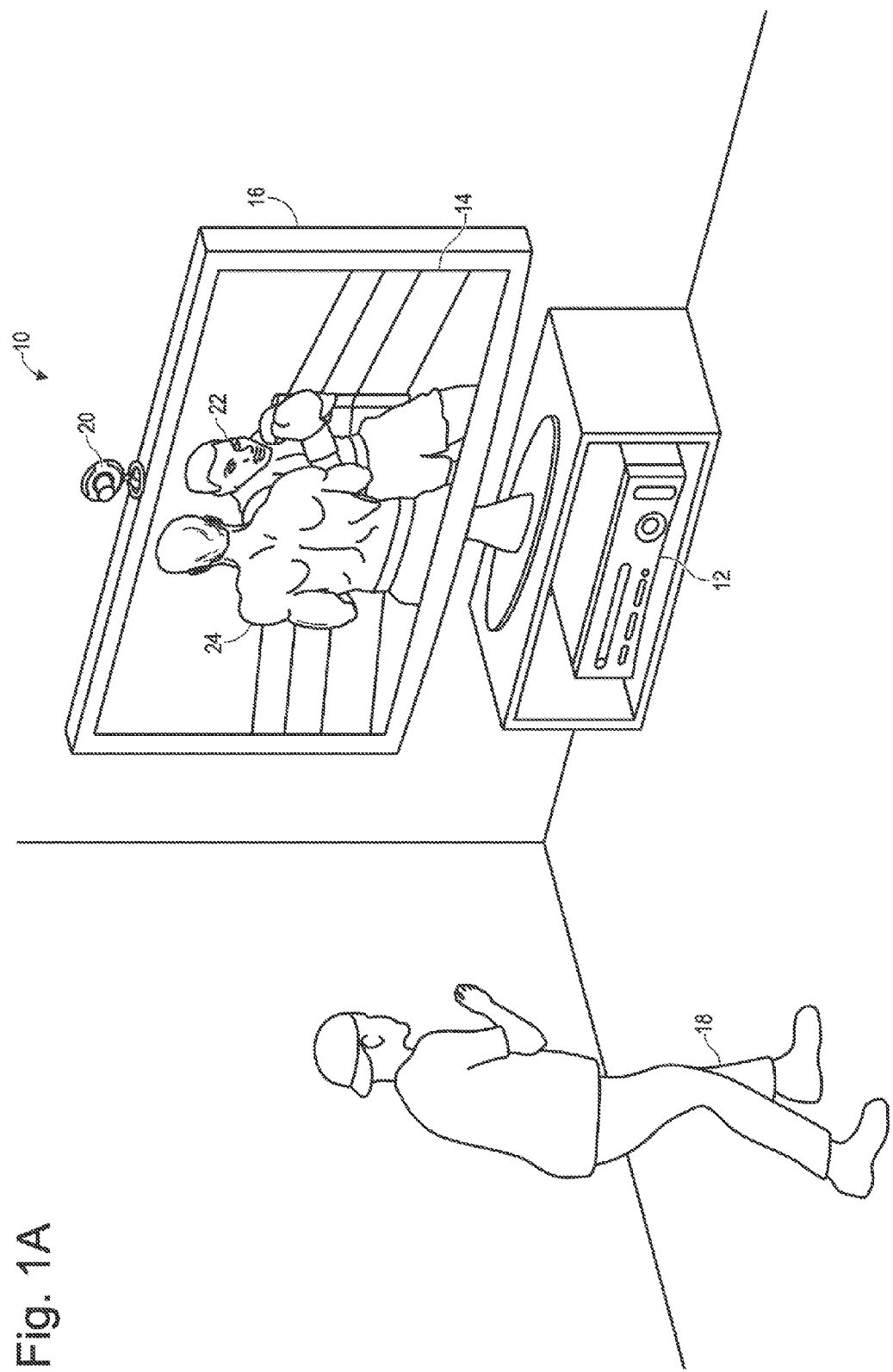
FIG. 1A shows an embodiment of an exemplary target recognition, analysis, and tracking system tracking a game player playing a boxing game.

FIG. 1A shows a nonlimiting example of a target tracking system 10. In particular, FIG. 1A shows a computer gaming system 12 that may be used to play a variety of different games, play one or more different media types, and/or control or manipulate non-game applications. FIG. 1A also shows a display 14 in the form of a high-definition television, or HDTV 16, which may be used to present game visuals to game players, such as game player 18. Furthermore, FIG. 1A shows a capture device in the form of a depth camera 20, which may be used to visually monitor one or more game players, such as game player 18. The example shown in FIG. 1A is nonlimiting. As described below with reference to FIG. 2, a variety of different types of target tracking systems may be used without departing from the scope of this disclosure.

A target tracking system may be used to recognize, analyze, and/or track one or more targets, such as game player 18. FIG. 1A shows a scenario in which game player 18 is tracked using depth camera 20 so that the movements of game player 18 may be interpreted by gaming system 12 as controls that can be used to affect the game being executed by gaming system 12. In other words, game player 18 may use his movements to control the game. The movements of game player 18 may be interpreted as virtually any type of game control.

Figure 1B:
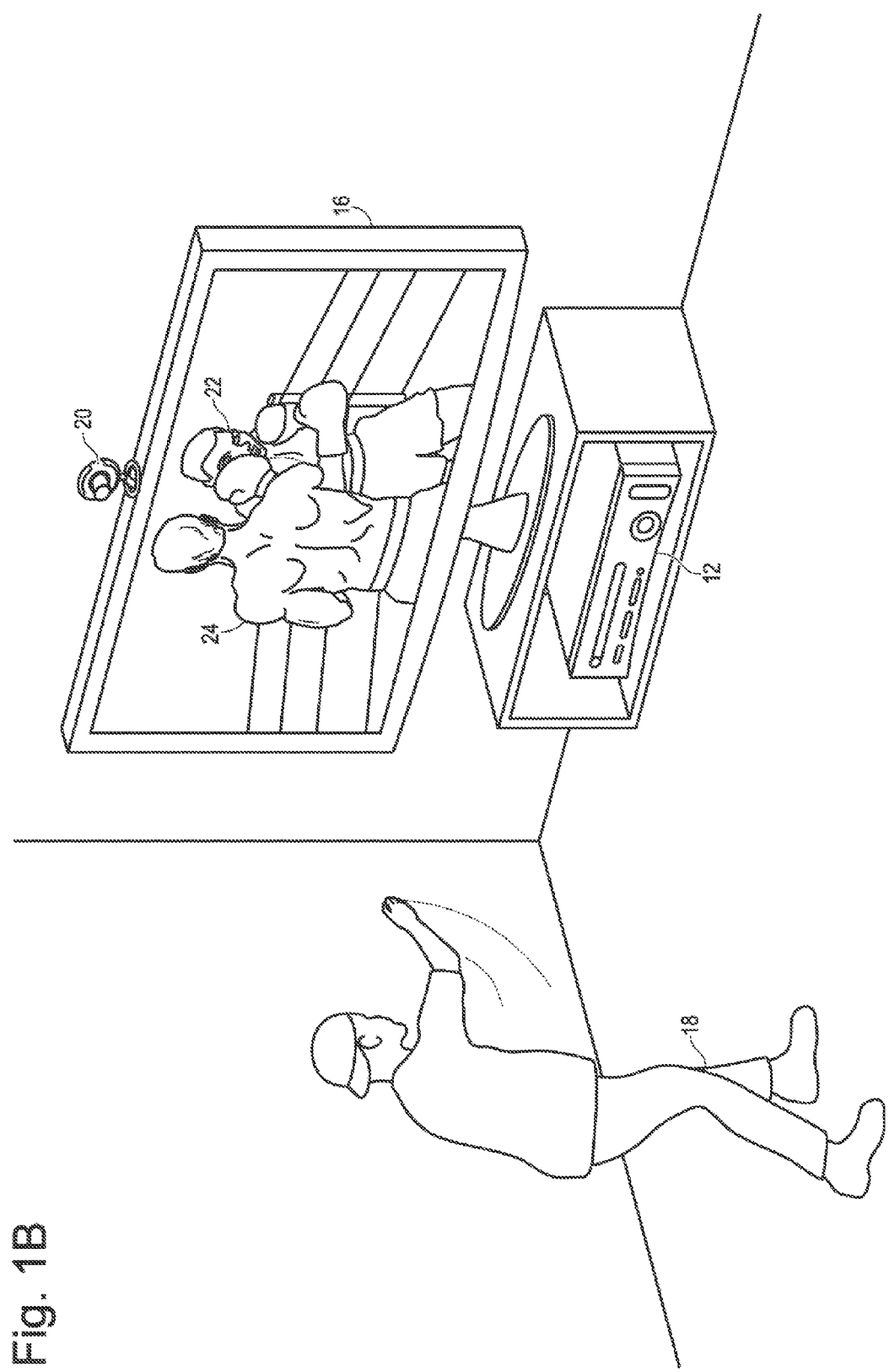
FIG. 1B shows the game player of FIG. 1A throwing a punch that is tracked and interpreted as a game control that causes a player avatar to throw a punch in game space.

The example scenario illustrated in FIG. 1A shows game player 18 playing a boxing game that is being executed by gaming system 12. The gaming system uses HDTV 16 to visually present a boxing opponent 22 to game player 18. Furthermore, the gaming system uses HDTV 16 to visually present a player avatar 24 that gaming player 18 controls with his movements. As shown in FIG. 1B, game player 18 can throw a punch in physical/world space as an instruction for player avatar 24 to throw a punch in game/virtual space. Gaming system 12 and depth camera 20 can be used to recognize and analyze the punch of game player 18 in physical space so that the punch can be interpreted as a game control that causes player avatar 24 to throw a punch in game space. For example, FIG. 1B shows HDTV 16 visually presenting player avatar 24 throwing a punch that strikes boxing opponent 22 responsive to game player 18 throwing a punch in physical space.

Other movements by game player 18 may be interpreted as other controls, such as controls to bob, weave, shuffle, block, jab, or throw a variety of different power punches. Furthermore, some movements may be interpreted into controls that serve purposes other than controlling player avatar 24. For example, the player may use movements to end, pause, or save a game, select a level, view high scores, communicate with a friend, etc.

In some embodiments, a target may include a human and an object. In such embodiments, for example, a player of an electronic game may be holding an object, such that the motions of the player and the object are utilized to adjust and/or control parameters of the electronic game. For example, the motion of a player holding a racket may be tracked and utilized for controlling an on-screen racket in an electronic sports game. In another example, the motion of a player holding an object may be tracked and utilized for controlling an on-screen weapon in an electronic combat game.

Target tracking systems may be used to interpret target movements as operating system and/or application controls that are outside the realm of gaming. Virtually any controllable aspect of an operating system and/or application, such as the boxing game shown in FIGS. 1A and 1B, may be controlled by movements of a target, such as game player 18. The illustrated boxing scenario is provided as an example, but is not meant to be limiting in any way. To the contrary, the illustrated scenario is intended to demonstrate a general concept, which may be applied to a variety of different applications without departing from the scope of this disclosure.

Figure 2:
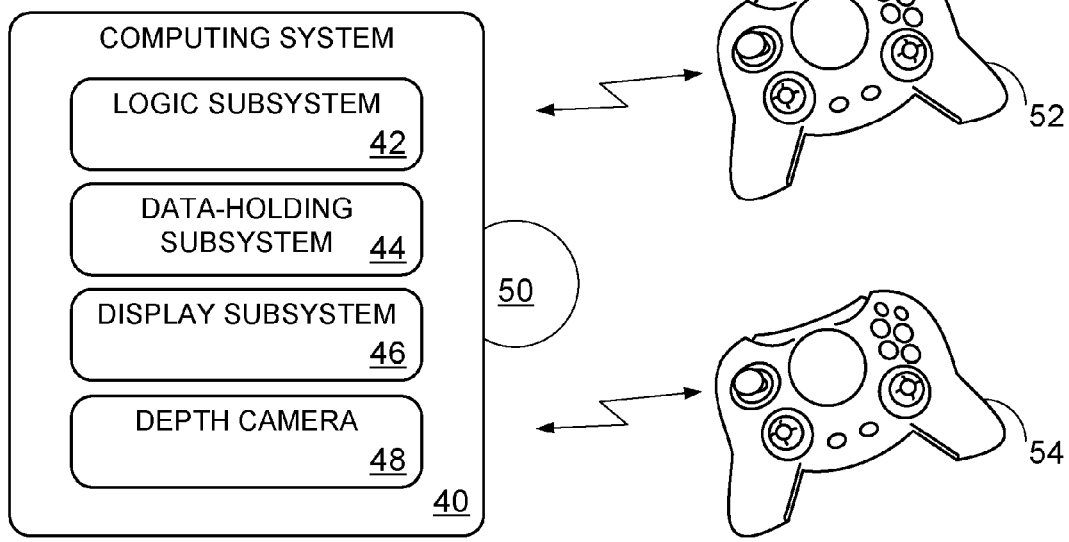
FIG. 2 schematically shows a computing system in accordance with an embodiment of the present disclosure.

The methods and processes described herein may be tied to a variety of different types of computing systems. FIGS. 1A and 1B show a nonlimiting example in the form of gaming system 12, HDTV 16, and depth camera 20. As another, more general, example, FIG. 2 schematically shows a computing system 40 that may perform one or more of the target recognition, tracking, and analysis methods and processes described herein. Computing system 40 may take a variety of different forms, including, but not limited to, gaming consoles, personal computing systems, public computing systems, human-interactive robots, military tracking and/or targeting systems, and character acquisition systems offering green-screen or motion-capture functionality, among others.

Computing system 40 may include a logic subsystem 42, a data-holding subsystem 44, a display subsystem 46, and/or a capture device 48. The computing system may optionally include components not shown in FIG. 2, and/or some components shown in FIG. 2 may be peripheral components that are not integrated into the computing system.

Logic subsystem 42 may include one or more physical devices configured to execute one or more instructions. For example, the logic subsystem may be configured to execute one or more instructions that are part of one or more programs, routines, objects, components, data structures, or other logical constructs. Such instructions may be implemented to perform a task, implement a data type, transform the state of one or more devices, or otherwise arrive at a desired result. The logic subsystem may include one or more processors that are configured to execute software instructions. Additionally or alternatively, the logic subsystem may include one or more hardware or firmware logic machines configured to execute hardware or firmware instructions. The logic subsystem may optionally include individual components that are distributed throughout two or more devices, which may be remotely located in some embodiments.

Data-holding subsystem 44 may include one or more physical devices configured to hold data and/or instructions executable by the logic subsystem to implement the herein described methods and processes. When such methods and processes are implemented, the state of data-holding subsystem 44 may be transformed (e.g., to hold different data). Data-holding subsystem 44 may include removable media and/or built-in devices. Data-holding subsystem 44 may include optical memory devices, semiconductor memory devices (e.g., RAM, EEPROM, flash, etc.), and/or magnetic memory devices, among others. Data-holding subsystem 44 may include devices with one or more of the following characteristics: volatile, nonvolatile, dynamic, static, read/write, read-only, random access, sequential access, location addressable, file addressable, and content addressable. In some embodiments, logic subsystem 42 and data-holding subsystem 44 may be integrated into one or more common devices, such as an application specific integrated circuit or a system on a chip.

FIG. 2 also shows an aspect of the data-holding subsystem in the form of computer-readable removable media 50, which may be used to store and/or transfer data and/or instructions executable to implement the herein described methods and processes.

Display subsystem 46 may be used to present a visual representation of data held by data-holding subsystem 44. As the herein described methods and processes change the data held by the data-holding subsystem, and thus transform the state of the data-holding subsystem, the state of display subsystem 46 may likewise be transformed to visually represent changes in the underlying data. As a nonlimiting example, the target recognition, tracking, and analysis described herein may be reflected via display subsystem 46 in the form of a game character that changes poses in game space responsive to the movements of a game player in physical space. Display subsystem 46 may include one or more display devices utilizing virtually any type of technology. Such display devices may be combined with logic subsystem 42 and/or data-holding subsystem 44 in a shared enclosure, or such display devices may be peripheral display devices, as shown in FIGS. 1A and 1B.

Computing system 40 further includes a capture device 48 configured to obtain depth images of one or more targets. Capture device 48 may be configured to capture video with depth information via any suitable technique (e.g., time-of-flight, structured light, stereo image, etc.). As such, capture device 48 may include a depth camera, a video camera, stereo cameras, and/or other suitable capture devices.

For example, in time-of-flight analysis, the capture device 48 may emit infrared light to the target and may then use sensors to detect the backscattered light from the surface of the target. In some cases, pulsed infrared light may be used, wherein the time between an outgoing light pulse and a corresponding incoming light pulse may be measured and used to determine a physical distance from the capture device to a particular location on the target. In some cases, the phase of the outgoing light wave may be compared to the phase of the incoming light wave to determine a phase shift, and the phase shift may be used to determine a physical distance from the capture device to a particular location on the target.

In another example, time-of-flight analysis may be used to indirectly determine a physical distance from the capture device to a particular location on the target by analyzing the intensity of the reflected beam of light over time, via a technique such as shuttered light pulse imaging.

In another example, structured light analysis may be utilized by capture device 48 to capture depth information. In such an analysis, patterned light (i.e., light displayed as a known pattern such as grid pattern, a stripe pattern, a constellation of dots, etc.) may be projected onto the target. Upon striking the surface of the target, the pattern may become deformed, and this deformation of the pattern may be studied to determine a physical distance from the capture device to a particular location on the target.

In another example, the capture device may include two or more physically separated cameras that view a target from different angles to obtain visual stereo data. In such cases, the visual stereo data may be resolved to generate a depth image.

In other embodiments, capture device 48 may utilize other technologies to measure and/or calculate depth values. Additionally, capture device 48 may organize the calculated depth information into "Z layers," i.e., layers perpendicular to a Z axis extending from the depth camera along its line of sight to the viewer.

In some embodiments, two or more different cameras may be incorporated into an integrated capture device. For example, a depth camera and a video camera (e.g., RGB video camera) may be incorporated into a common capture device. In some embodiments, two or more separate capture devices may be cooperatively used. For example, a depth camera and a separate video camera may be used. When a video camera is used, it may be used to provide target tracking data, confirmation data for error correction of target tracking, image capture, face recognition, high-precision tracking of fingers (or other small features), light sensing, and/or other functions.

It is to be understood that at least some target analysis and tracking operations may be executed by a logic machine of one or more capture devices. A capture device may include one or more onboard processing units configured to perform one or more target analysis and/or tracking functions. A capture device may include firmware to facilitate updating such onboard processing logic.

Computing system 40 may optionally include one or more input devices, such as controller 52 and controller 54. Input devices may be used to control operation of the computing system. In the context of a game, input devices, such as controller 52 and/or controller 54 can be used to control aspects of a game not controlled via the target recognition, tracking, and analysis methods and procedures described herein. In some embodiments, input devices such as controller 52 and/or controller 54 may include one or more of accelerometers, gyroscopes, infrared target/sensor systems, etc., which may be used to measure movement of the controllers in physical space. In some embodiments, the computing system may optionally include and/or utilize input gloves, keyboards, mice, track pads, trackballs, touch screens, buttons, switches, dials, and/or other input devices. As will be appreciated, target recognition, tracking, and analysis may be used to control or augment aspects of a game, or other application, conventionally controlled by an input device, such as a game controller. In some embodiments, the target tracking described herein can be used as a complete replacement to other forms of user input, while in other embodiments such target tracking can be used to complement one or more other forms of user input.

Computing system 40 may be configured to perform the target tracking methods described herein. However, it should be understood that computing system 40 is provided as a nonlimiting example of a device that may perform such target tracking. Other devices are within the scope of this disclosure.

Computing system 40, or another suitable device, may be configured to represent each target with a model. As described in more detail below, information derived from such a model can be compared to information obtained from a capture device, such as a depth camera, so that the fundamental proportions or shape of the model, as well as its current pose, can be adjusted to more accurately represent the modeled target. The model may be represented by one or more polygonal meshes, by a set of mathematical primitives, and/or via other suitable machine representations of the modeled target.

Figure 3:
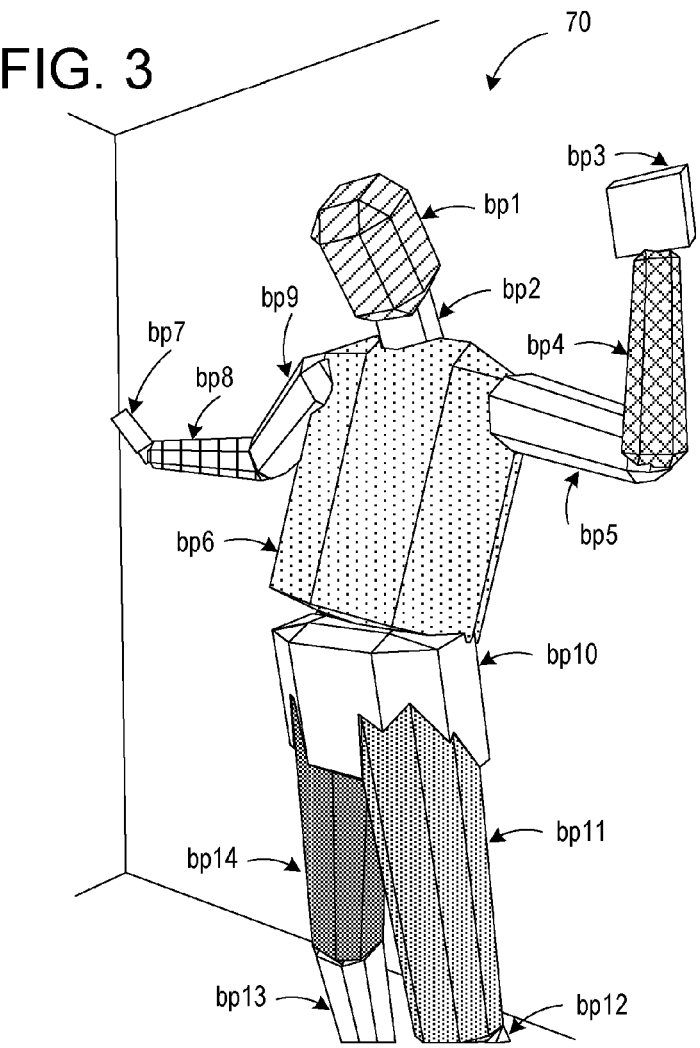
FIG. 3 shows an exemplary body model used to represent a human target.

FIG. 3 shows a nonlimiting visual representation of an example body model 70. Body model 70 is a machine representation of a modeled target (e.g., game player 18 from FIGS. 1A and 1B). The body model may include one or more data structures that include a set of variables that collectively define the modeled target in the language of a game or other application/operating system.

A model of a target can be variously configured without departing from the scope of this disclosure. In some examples, a model may include one or more data structures that represent a target as a three-dimensional model comprising rigid and/or deformable shapes, or body parts. Each body part may be characterized as a mathematical primitive, examples of which include, but are not limited to, spheres, anisotropically-scaled spheres, cylinders, anisotropic cylinders, smooth cylinders, boxes, beveled boxes, prisms, and the like.

For example, body model 70 of FIG. 3 includes body parts bp1 through bp14, each of which represents a different portion of the modeled target. Each body part is a three-dimensional shape. For example, bp3 is a rectangular prism that represents the left hand of a modeled target, and bp5 is an octagonal prism that represents the left upper-arm of the modeled target. Body model 70 is exemplary in that a body model may contain any number of body parts, each of which may be any machine-understandable representation of the corresponding part of the modeled target.

A model including two or more body parts may also include one or more joints. Each joint may allow one or more body parts to move relative to one or more other body parts. For example, a model representing a human target may include a plurality of rigid and/or deformable body parts, wherein some body parts may represent a corresponding anatomical body part of the human target. Further, each body part of the model may comprise one or more structural members (i.e., "bones" or skeletal parts), with joints located at the intersection of adjacent bones. It is to be understood that some bones may correspond to anatomical bones in a human target and/or some bones may not have corresponding anatomical bones in the human target.

Figure 5:
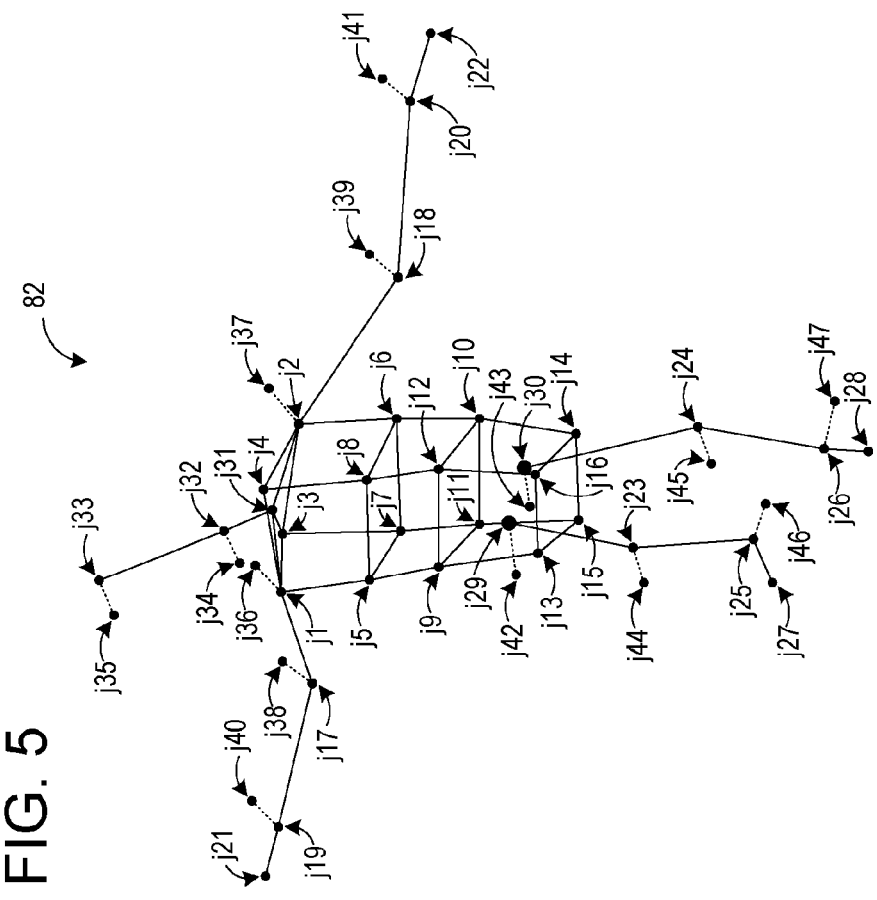
FIG. 5 shows a skewed view of an exemplary skeletal model used to represent a human target.
Figure 4:
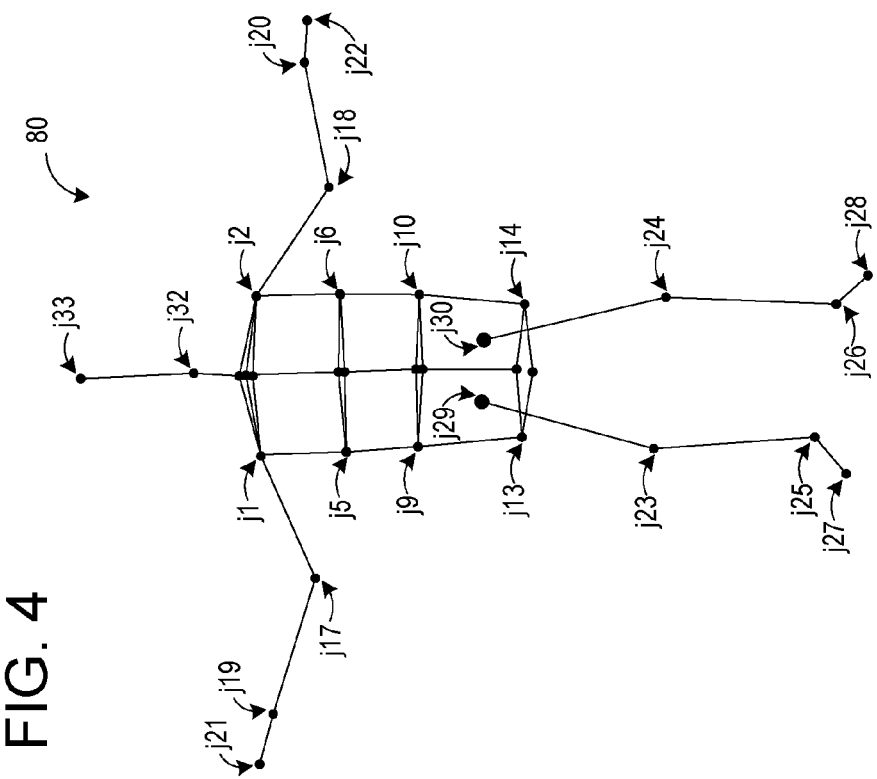
FIG. 4 shows a substantially frontal view of an exemplary skeletal model used to represent a human target.

The bones and joints may collectively make up a skeletal model, which may be a constituent element of the body model. In some embodiments, a skeletal model may be used instead of another type of model, such as model 70 of FIG. 3. The skeletal model may include one or more skeletal members for each body part and a joint between adjacent skeletal members. Exemplary skeletal model 80 and exemplary skeletal model 82 are shown in FIGS. 4 and 5, respectively. FIG. 4 shows a skeletal model 80 as viewed from the front, with joints j1 through j33. FIG. 5 shows a skeletal model 82 as viewed from a skewed view, also with joints j1 through j33.

Skeletal model 82 further includes roll joints j34 through j47, where each roll joint may be utilized to track axial roll angles. For example, an axial roll angle may be used to define a rotational orientation of a limb relative to its parent limb and/or the torso. For example, if a skeletal model is illustrating an axial rotation of an arm, roll joint j40 may be used to indicate the direction the associated wrist is pointing (e.g., palm facing up). By examining an orientation of a limb relative to its parent limb and/or the torso, an axial roll angle may be determined. For example, if examining a lower leg, the orientation of the lower leg relative to the associated upper leg and hips may be examined in order to determine an axial roll angle.

A skeletal model may include more or fewer joints without departing from the spirit of this disclosure.

As described above, some models may include a skeleton and/or other body parts that serve as a machine representation of a modeled target. In some embodiments, a model may alternatively or additionally include a wireframe mesh, which may include hierarchies of rigid polygonal meshes, one or more deformable meshes, or any combination of the two.

The above described body part models and skeletal models are nonlimiting example types of models that may be used as machine representations of a modeled target. Other models are also within the scope of this disclosure. For example, some models may include polygonal meshes, patches, non-uniform rational B-splines, subdivision surfaces, or other high-order surfaces. A model may also include surface textures and/or other information to more accurately represent clothing, hair, and/or other aspects of a modeled target. A model may optionally include information pertaining to a current pose, one or more past poses, and/or model physics. It is to be understood that a variety of different models that can be posed are compatible with the herein described target recognition, analysis, and tracking.

As mentioned above, a model serves as a representation of a target, such as game player 18 in FIGS. 1A and 1B. As the target moves in physical space, information from a capture device, such as depth camera 20 in FIGS. 1A and 1B, can be used to adjust a pose and/or the fundamental size/shape of the model so that it more accurately represents the target.

Figure 6:
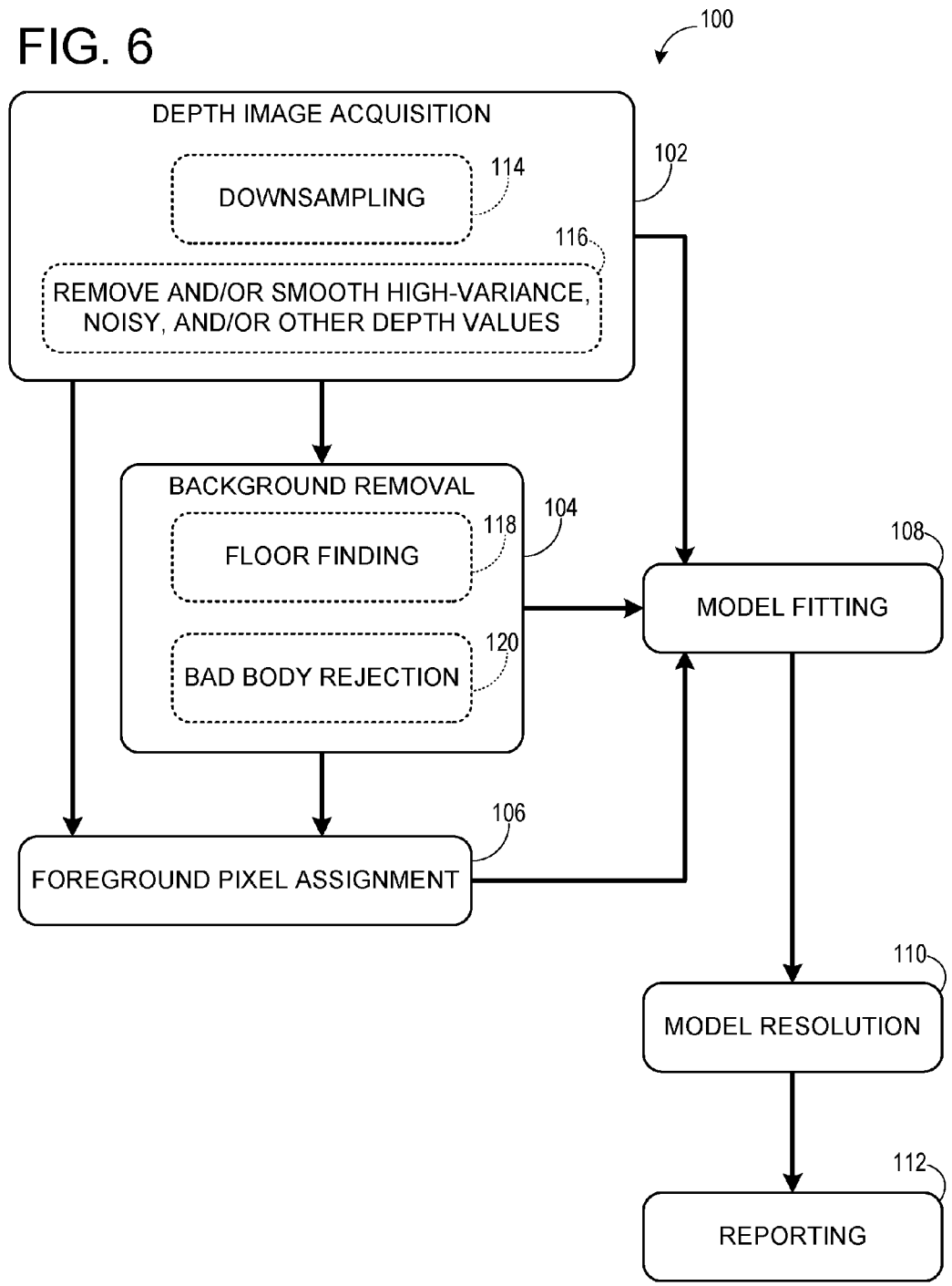
FIG. 6 shows a pipeline for tracking a target.

FIG. 6 shows a flow diagram of an example pipeline 100 for tracking one or more targets. In some embodiments, the target(s) may be human game players. Pipeline 100 may be executed by a computing system (e.g., gaming system 12 shown in FIG. 1A and/or computing system 40 shown in FIG. 2) to track one or more players interacting with an electronic game. As introduced above, tracking of the players allows physical movements of those players to act as real-time user controls that adjust and/or control parameters of the electronic game. It is to be understood that gaming is provided as a nonlimiting example, and the disclosed pipeline may be used to track human or nonhuman targets for a variety of other purposes.

The disclosed pipeline can be used to accurately and efficiently track one or more humans that are present in the field of view of a depth camera. The pipeline can model and track one or more humans in real time, thus providing a responsive, immersive, and realistic experience for a human being tracked. Furthermore, the pipeline is believed to be efficient, so as to limit the computing resources used to execute the pipeline.

Pipeline 100 includes six conceptual phases: depth image acquisition 102, background removal 104, foreground pixel assignment 106, model fitting 108, model resolution 110, and reporting 112.

Depth image acquisition 102 may include receiving an observed depth image of the target from a source. In some embodiments, the source may be a depth camera configured to obtain depth information about the target via a suitable technique such as time-of-flight analysis, structured light analysis, stereo vision analysis, or other suitable techniques. The observed depth image may include a plurality of observed pixels, where each observed pixel has an observed depth value. The observed depth value includes depth information of the target as viewed from the source.

The depth image may optionally be represented as a pixel matrix that includes, for each pixel address, a depth value indicating a world space depth from the plane of the depth camera, or another suitable reference plane, to a surface at that pixel address.

Figure 7:
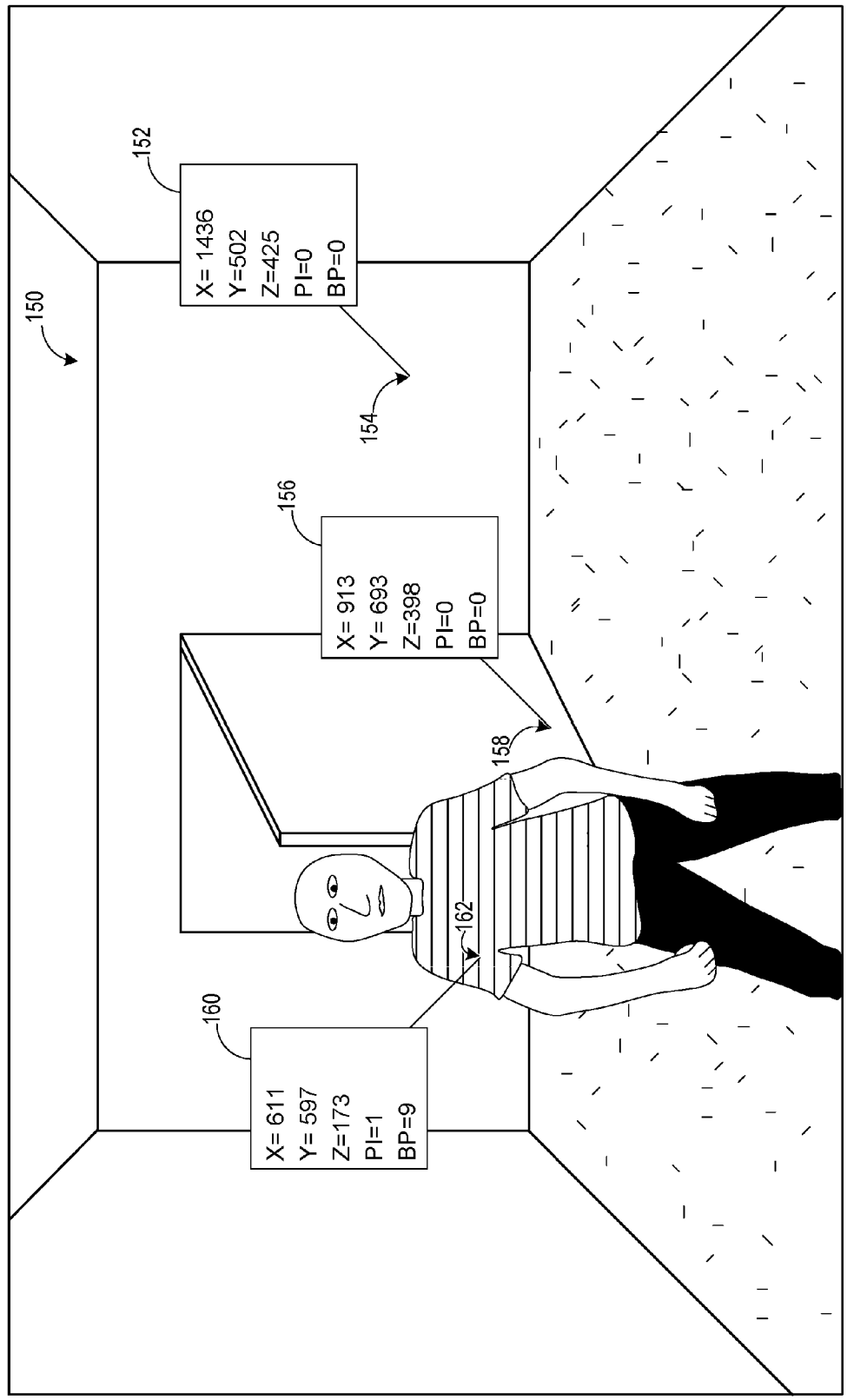
FIG. 7 shows a scene as viewed by a depth camera with schematic data structures showing data used to track a target.

FIG. 7 schematically shows a scene 150 captured by a depth camera. The depth camera determines a Z-value of a surface at each pixel address. As an example, FIG. 7 schematically shows a data structure 152 used to represent pixel 154 at pixel address [1436, 502]. Data structure 152 may be an element of a pixel matrix, for example. Data structure 152 includes a Z-value of 425 for pixel 154, thus indicating that the surface at that pixel address, in this case a wall, is 425 units deep in world space. As another example, a data structure 156 is used to represent pixel 158 at pixel address [913, 693]. Data structure 156 includes a Z-value of 398 for pixel 158, thus indicating that the surface at that pixel address, in this case a door, is 398 units deep in world space. As another example, a data structure 160 is used to represent pixel 162 at pixel address [611, 597]. Data structure 160 includes a Z-value of 173 for pixel 162, thus indicating that the surface at that pixel address, in this case a human target, is 173 units deep in world space. While three pixels are provided as examples above, it is to be understood that every pixel captured by a capture device, or a downsampled set thereof, may be represented in this manner.

As shown at 114 of FIG. 6, depth image acquisition 102 may optionally include downsampling the observed depth image to a lower processing resolution. Downsampling to a lower processing resolution may allow the observed depth image to be more easily utilized and/or more quickly processed with less computing overhead.

As shown at 116 of FIG. 6, depth image acquisition 102 may optionally include removing and/or smoothing one or more high-variance and/or noisy depth values from the observed depth image. Such high-variance and/or noisy depth values in the observed depth image may result from a number of different sources, such as random and/or systematic errors occurring during the image capturing process, defects and/or aberrations resulting from the capture device, etc. Since such high-variance and/or noisy depth values may be artifacts of the image capturing process, including these values in any future analysis of the image may skew results and/or slow calculations. Thus, removal of such values may provide better data integrity and/or speed for future calculations.

Background removal 104 may include distinguishing targets that are to be tracked from non-target background elements in the observed depth image. As used herein, the term "background" is used to describe anything in the scene that is not part of the target(s) to be tracked. The background may include elements that are in front of (i.e., closer to the depth camera) than the target(s) to be tracked. Distinguishing foreground elements that are to be tracked from background elements that may be ignored can increase tracking efficiency and/or simplify downstream processing.

Background removal 104 may include assigning each data point (e.g., pixel) of the processed depth image a player index that identifies that data point as belonging to a particular target or to a non-target background element. When such an approach is used, pixels or other data points assigned a background index can be removed from consideration in one or more subsequent phases of pipeline 100.

As an example, pixels corresponding to a first player can be assigned a player index equal to one, pixels corresponding to a second player can be assigned a player index equal to two, and pixels that do not correspond to a target player can be assigned a player index equal to zero. Such player indices can be saved in any suitable manner. In some embodiments, a pixel matrix may include, at each pixel address, a player index indicating if a surface at that pixel address belongs to a background element, a first player, a second player, etc. For example, FIG. 7 shows data structure 152 including a player index equal to zero for wall pixel 154, data structure 156 including a player index equal to zero for door pixel 158, and data structure 160 including a player index equal to one for player pixel 162. While this example shows the player/background indices as part of the same data structure that holds the depth values, other arrangements are possible. In some embodiments, depth information, player/background indices, body part indices, body part probability distributions, and other information may be tracked in a common data structure, such as a matrix addressable by pixel address. In other embodiments, different masks may be used to track information through pipeline 100. The player index may be a discrete index or a fuzzy index indicating a probability that a pixel belongs to a particular target and/or the background.

A variety of different background removal techniques may be used. Some background removal techniques may use information from one or more previous frames to assist and improve the quality of background removal. For example, a depth history image can be derived from two or more frames of depth information, where the depth value for each pixel is set to the deepest depth value that pixel experiences during the sample frames. A depth history image may be used to identify moving objects in the foreground of a scene (e.g., a human game player) from the nonmoving background elements. In a given frame, the moving foreground pixels are likely to have depth values that are smaller than the corresponding depth values (at the same pixel addresses) in the depth history image. In a given frame, the nonmoving background pixels are likely to have depth values that match the corresponding depth values in the depth history image.

As one nonlimiting example, a connected island background removal may be used. Using a connected island approach, an input depth stream can be used to generate a set of samples (e.g., voxels) that can be conceptually unprojected back into world space. Foreground objects are then isolated from background objects using information from previous frames. In particular, the process can be used to determine whether one or more voxels in the grid are associated with a background by determining whether an object of the one or more objects in the grid is moving. This may be accomplished, at least in part, by determining whether a given voxel is close to or behind a reference plate that is a history of the minimum or maximum values observed for background objects. The output from this process can be used to assign each data point (e.g., pixel) a player index or a background index. Connected island background removal is described in U.S. patent application Ser. No. 12/575,363, filed Oct. 7, 2009, the entirety of which is hereby incorporated herein by reference.

Additional or alternative background removal techniques can be used to assign each data point a player index or a background index, or otherwise distinguish foreground targets from background elements. In some embodiments, particular portions of a background may be identified. For example, at 118 of FIG. 6, a floor in a scene may be identified as part of the background. In addition to being removed from consideration when processing foreground targets, a found floor can be used as a reference surface that can be used to accurately position virtual objects in game space, stop a flood-fill that is part of generating a connected island, and/or reject an island if its center is too close to the floor plane.

A variety of different floor finding techniques may be used. In some embodiments, a depth image can be analyzed in screen space row by row. For selected candidate rows of the screen space depth image (e.g., rows near the bottom of the image), a straight depth line can be interpolated through two candidate points that are believed to be located on a floor surface. Boundary lines can then be fit to endpoints of the straight depth lines. The boundary lines can be averaged and used to define a plane that is believed to correspond to the floor surface. Screen space floor detection of this kind is described in U.S. patent application Ser. No. 12/563,456, filed Sep. 21, 2009, the entirety of which is hereby incorporated herein by reference.

In other embodiments, a floor finding technique may use three points from a depth image to define a candidate floor surface. The three points used to define the candidate can be randomly selected from a lower portion of the depth image, for example. If the normal of the candidate is substantially vertical in world space, the candidate is considered, and if the normal of the candidate is not substantially vertical, the candidate can be rejected. A candidate with a substantially vertical normal can be scored by counting how many points from the depth image are located below the candidate and/or what the average distance such points are below the candidate. If the number of points below the candidate exceeds a threshold and/or the average distance of points below the candidate exceeds a threshold, the candidate can be rejected. Different candidates are tested, and the candidate with the best score is saved. The saved candidate may be blessed as the actual floor if a predetermined number of candidates with lower scores are tested against the saved candidate.

Additional or alternative background removal techniques can be used to assign each data point a player index or a background index, or otherwise distinguish foreground targets from background elements. For example, in FIG. 6 pipeline 100 includes bad body rejection 120. In some embodiments, objects that are initially identified as foreground objects can be rejected because they do not resemble any known target. For example, an object that is initially identified as a foreground object can be tested for basic criteria that are to be present in any objects to be tracked (e.g., head and/or torso identifiable, bone lengths within predetermined tolerances, etc.). If an object that is initially identified as being a candidate foreground object fails such testing, it may be reclassified as a background element and/or subjected to further testing. In this way, moving objects that are not to be tracked, such as a chair pushed into the scene, can be classified as background elements because such elements do not resemble a human target.

After foreground pixels are distinguished from background pixels, pipeline 100 further classifies the pixels that are considered to correspond to the foreground objects that are to be tracked. In particular, at foreground pixel assignment 106 of FIG. 6, each foreground pixel is analyzed to determine what part of a player target's body that foreground pixel is likely to belong.

A variety of different foreground pixel assignment techniques can be used to assess which part of a player target's body, or a machine representation of the body, a particular pixel is likely to belong. A pixel matrix or other data structure may include, for each pixel address, a body part index, confidence value, and/or body part probability distribution indicating the part, or parts, to which a pixel is likely to belong. For example, FIG. 7 schematically shows data structure 160 including a body part index equal to nine, which corresponds to an upper, right arm, for player pixel 162. In the simplified version of FIG. 7, the body part index is resolved to a single candidate body part (i.e., body part nine). In practice, the body part information may be a soft labeling that is represented as a histogram over possible body parts for each pixel. In other words, a probability distribution of all likely body parts may be used in some embodiments, as described in more detail below.

As one nonlimiting example, machine-learning can be used to assign each foreground pixel a body part index and/or body part probability distribution. The machine-learning approach analyzes a foreground object using information learned from analyzing a prior-trained collection of known poses. This approach can be used to assign each foreground pixel a body part index or distribution without any prior context (i.e., knowledge of the prior frame is not needed).

In some embodiments, the machine-learning foreground pixel assignment may utilize one or more decision trees to analyze each foreground pixel of interest in an observed depth image. Such analysis can find a best-guess of the body part for that pixel and the confidence that the best-guess is correct. In some embodiments, the best-guess may include a probability distribution over two or more possible body parts, and the confidence may be represented by the relative probabilities of the different possible body parts.

At each node of the decision tree, an observed depth value comparison between two pixels is made, and, depending on the result of the comparison, a subsequent depth value comparison between two pixels is made at the child node of the decision tree. The result of such comparisons at each node determines the pixels that are to be compared at the next node. The terminal nodes of each decision tree result in a body part classification and associated confidence in the classification.

In some embodiments, subsequent decision trees may be used to iteratively refine the best-guess of the body part for each pixel and the confidence that the best-guess is correct. For example, once the pixels have been classified with the first classifier tree (based on neighboring depth values), a refining classification may be performed to classify each pixel by using a second decision tree that looks at the previous classified pixels and/or depth values. A third pass may also be used to further refine the classification of the current pixel by looking at the previous classified pixels and/or depth values. It is to be understood that virtually any number of iterations may be performed, with fewer iterations resulting in less computational expense and more iterations potentially offering more accurate classifications and/or confidences.

The decision trees may be constructed during a training mode in which a sample of known models in known poses are analyzed to determine the questions (i.e., tests) that can be asked at each node of the decision trees in order to produce accurate pixel classifications.

Turning back to FIG. 6, after foreground pixels are labeled with body part information, pipeline 100 includes model fitting 108, which finds one or more possible skeletons that serve as machine representations of the player target.

A variety of different model fitting techniques may be used. During model fitting 108, a human target is modeled as a skeleton including a plurality of skeletal points, each skeletal point having a three-dimensional location in world space. The various skeletal points may correspond to actual joints of a human target, terminal ends of a human target's extremities, and/or points without a direct anatomical link to the human target. Each skeletal point has at least three degrees of freedom (e.g., world space x, y, z). As such, the skeleton can be fully defined by 3×λ values, where λ is equal to the total number of skeletal points included in the skeleton. A skeleton with 31 skeletal points can be defined by 93 values, for example. As described with reference to FIG. 5 above, some skeletal points may account for axial roll angles.

The various model fitting approaches compatible with pipeline 100 may use depth information, background information, body part information, and/or prior trained anatomical and kinetic information to deduce one or more skeleton(s) that closely model a human target.

As an example, the body part information that is assessed for the foreground pixels may be used to find one or more candidate locations (e.g., centroids) for one or more skeletal bones. Furthermore, a plurality of plausible skeletons may be assembled to include skeletal bones at different combinations of the plurality of candidate locations. The various plausible skeletons may then be scored, and the scored proposals can be combined into a final estimate.

Clumps of foreground pixels may individually include body part probability distributions indicating that a particular body part is probable for that clump. In some cases, two or more clumps that are spaced apart from one another may indicate that the same body part is probable. For example, the clumps of pixels actually showing the right and left hands of a target may both be labeled with body part information indicating a high probability for a right hand body part. As such, two or more centroid candidates may be calculated for each body part. Each centroid candidate for a particular body part may be represented in four dimensions—x, y, z and probability w that the candidate belongs to that body part. In other words, each centroid defines a location of a clump of neighboring foreground pixels individually having body part probability distributions indicating that that body part is probable for that clump of neighboring foreground pixels. Furthermore, each centroid defines a single probability representing all individual body part probability distributions within the clump.

Two or more different centroid candidates can be considered in finding a skeleton that closely models a human target. The various candidate centroids can be scored against one another (e.g., number of pixels in clump multiplied by average probability that pixels in the clump belong to a particular body part). The scores may be adjusted based on one or more constraints (e.g., apply a penalty when a distance between the highest scoring clump for a body part in a previous frame exceeds a threshold distance to the highest scoring clump for the same body part in the current frame). The scored centroids may be used to construct one or more plausible skeletons, from which a single skeleton can be derived.

Considering plural plausible skeletons employs a probabilistic principle of least commitment to deal with uncertainty. As such, many possibilities are considered throughout the model fitting phase of the pipeline, without making hard decisions until such decisions can no longer be avoided.

When the data is unambiguous, the plurality of plausible skeletons will be very similar to each other. If there are situations in which there are numerous possibilities for one or more parts of the skeleton, the sample set will be more diverse, thus capturing the uncertainty.

The accuracy of the approximation can improve as the number of plausible skeletons, n, increases. However, computational cost also increases as n increases. The model fitting phase of the pipeline can be restrained to focus on a relatively small number of samples (e.g., n<100). To improve results when working with fewer samples, information from foreground pixel assignment 106 and past skeletal motion information may be used to improve the intelligence of the search for a set of proposal skeletons. The plausible skeletons can be evaluated against the input data, and other sources of information, to arrive at a final approximation.

As shown in FIG. 6, model fitting 108 may receive input from previous phases of pipeline 100. Model fitting 108 may receive one or more raw depth images from depth image acquisition 102, player/background information from background removal 104, and body part information from foreground pixel assignment 106.

With all available inputs, foreground regions of the depth image may be segmented into a set of patches, which are regions of roughly consistent depth. This effectively approximates the full depth image by a set of small planar regions. For a modest loss of fidelity, this can reduce the bandwidth requirements from millions of pixel accesses, to thousands of patch accesses.

Plausible skeletons may then be proposed from the previous foreground pixel assignments. The purpose of this phase is to convert pixel-wise body part probability distributions into proposals for full skeletons (e.g., 93 values for a λ=31 skeleton). In the spirit of the principle of least commitment, all likely locations for a body part are considered until global information can be brought to bear. Therefore, this phase may include two components: a body part proposer, which extracts candidate locations from foreground pixel assignment 106 for each body part independently (e.g., finding candidate centroids for each body part, as introduced above); and a skeleton generator, which combines these candidates into complete skeletons.

As discussed above, in at least some embodiments, model fitting can be used to find a plurality of different plausible skeletons. A proposed skeleton can be scored using a variety of different metrics. In FIG. 6, pipeline 100 includes model resolution 110, in which a single skeleton is derived from the plurality of plausible skeletons. A variety of different model resolution techniques may be used. In some embodiments, two or more plausible skeletons may be scored against each other based on weight, observed motion over time, anticipated bone length, foreground/background crossing, and/or other factors. A proposed skeleton with a highest score may be selected; or the best scoring portions of two or more different proposed skeletons, from one or more different frames, may be combined into a selected skeleton. Furthermore, various constraints (e.g., bone length, joint angle, collision testing, etc.) may be applied to one or more skeletons to shift the proposed skeleton(s) into a better matching pose.

Pipeline 100 also includes reporting 112, where the selected skeleton is reported for use by other applications. Reporting can be performed in any suitable manner. As a nonlimiting example, an application programming interface (API) may be used to report the selected skeleton. Such an (API) may be configured to communicate the joint positions, joint velocities, joint accelerations, confidences in positions, velocities, and/or accelerations, and/or other information related to the selected skeleton for one or more targets. A content receiver (e.g., a gaming application) may then use the reported information as desired.

Figure 8:
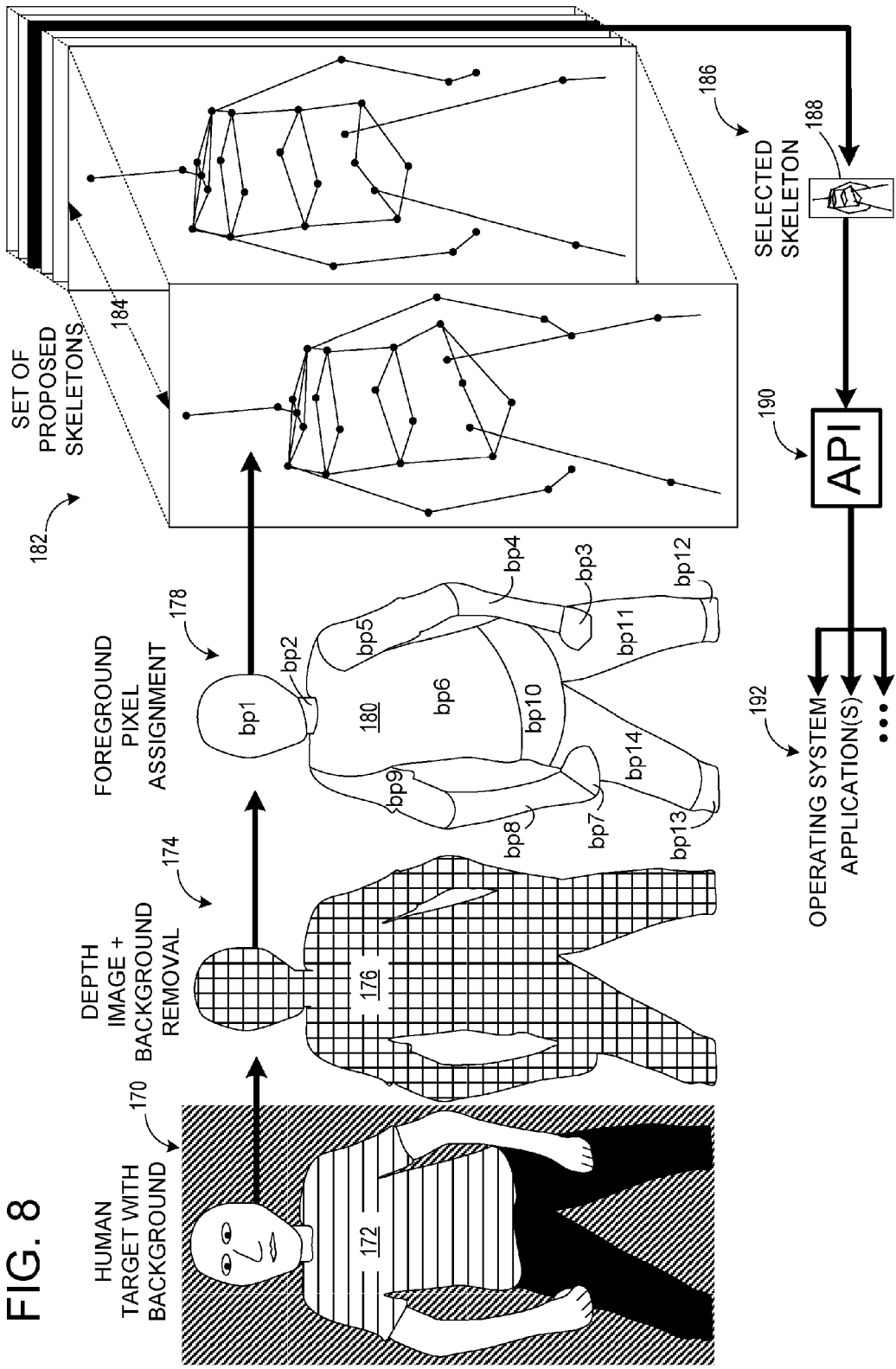
FIG. 8 schematically shows a progression of data through a target pose tracking pipeline.

FIG. 8 graphically shows a progression of data through a pose tracking pipeline. On the left, a scene 170 includes a human target 172. At 174, scene 170 is imaged by a depth camera and background information is removed from the scene. Silhouette 176 schematically represents one or more data structures capturing the depth information and player index information (e.g., as captured during depth image acquisition 102 and background removal 104 of pipeline 100).

At 178, the depth information believed to belong to the player target is analyzed to determine what part of a player target's body each pixel is likely to belong. Map 180 schematically represents one or more data structures capturing the body part information (e.g., as deduced during foreground pixel assignment 106 of pipeline 100).

At 182, a set of plausible skeletons are proposed, where each skeleton is an attempt to model the human target as a machine representation. Skeleton set 184 schematically represents one or more data structures defining the proposed skeletons (e.g., as proposed during model fitting 108 of pipeline 100). It is to be understood that the graphical depictions of skeletons in FIGS. 4, 5, and 8 is nonlimiting. Skeletons with a different number and/or configuration of skeletal points and skeletal bones may be used.

At 186, a skeleton is selected based on the set of plausible skeletons. Skeleton 188 schematically represents one or more data structures defining the selected skeleton (e.g., as selected during model resolution 110 of pipeline 100).

At 190, the selected skeleton is reported (e.g., as described with reference to model reporting 112 of pipeline 100). As indicated at 192, the reported skeleton may be used as an input by an operating system, one or more applications, or any other suitable receiver.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombination of the various processes, systems and configurations, and other features, functions, acts, and/or properties disclosed herein, as well as any and all equivalents thereof.

The invention claimed is:

1. A method of computer modeling a subject, the method comprising:
   receiving from a source a depth image of a scene including the subject, the depth image including a depth for each of a plurality of pixels;
   identifying pixels of the depth image that image the subject; and
   deriving from the identified pixels of the depth image one or more machine readable data structures representing the subject as a model including a plurality of different geometric shapes.

2. The method of claim 1, where the plurality of different geometric shapes include one or more spheres.

3. The method of claim 2, where each of the one or more spheres is represented by a position variable defining a centroid position of that sphere.

4. The method of claim 3, where each of the one or more spheres is represented by a size variable defining a size of that sphere.

5. The method of claim 1, where each of the plurality of different geometric shapes is represented by one or more size variables defining a size of that shape and one or more position variables defining a position of that shape.

6. The method of claim 1, further comprising deriving from the model a skeleton including a plurality of skeletal points, each skeletal point having a three-dimensional location.

7. The method of claim 1, where the source includes a structured light depth sensor.

8. The method of claim 1, where the source includes a time-of-flight depth sensor.

9. A method of computer modeling a subject, the method comprising:
   receiving from a source a depth image of a scene including the subject, the depth image including a depth for each of a plurality of pixels; and
   modeling the subject with a plurality of shapes having a same geometric shape and two or more different sizes, each of the plurality of shapes characterized by a machine readable position variable, the machine readable position variable for each shape defining a position of that shape within a volume occupied by the subject.

10. The method of claim 9, where the plurality of shapes are a plurality of spheres.

11. The method of claim 10, where the machine readable position variable for each of the plurality of spheres defines a centroid position of that sphere.

12. The method of claim 10, where each of the plurality of spheres is represented by a size variable defining a size of that sphere.

13. The method of claim 9, further comprising deriving from the plurality of shapes a skeleton including a plurality of skeletal points, each skeletal point having a three-dimensional location.

14. The method of claim 9, where the source includes a structured light depth sensor.

15. The method of claim 9, where the source includes a time-of-flight depth sensor.

16. A data-holding subsystem holding instructions executable by a logic subsystem to:
receive from a source a depth image of a scene including a subject; and
model the subject with a plurality of shapes, each of the plurality of shapes characterized by a machine readable position variable, the machine readable position variable for each shape defining a position of that shape such that the plurality of shapes collectively occupy a volume that approximates the subject.

17. The data-holding subsystem of claim 16, where all of the plurality of shapes are a same geometric shape and a same size.

18. The data-holding subsystem of claim 16, where the source includes a structured light depth sensor.

19. The data-holding subsystem of claim 16, where the source includes a time-of-flight depth sensor.

20. The data-holding subsystem of claim 16, where at least one of the plurality of shapes has a different geometric shape than at least one other of the plurality of shapes.

* * * * *